United States Patent
Gorey et al.

(10) Patent No.: US 11,754,482 B2
(45) Date of Patent: Sep. 12, 2023

(54) METHOD AND SYSTEM FOR DETERMINING VISCOSITY INFORMATION OF FLUIDS

(71) Applicant: Tata Consultancy Services Limited, Mumbai (IN)

(72) Inventors: Abhijeet Gorey, Kolkata (IN); Arijit Sinharay, Kolkata (IN); Chirabrata Bhaumik, Kolkata (IN); Tapas Chakravarty, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 38 days.

(21) Appl. No.: 17/456,063

(22) Filed: Nov. 22, 2021

(65) Prior Publication Data
US 2022/0236161 A1    Jul. 28, 2022

(30) Foreign Application Priority Data

Jan. 28, 2021 (IN) .............................. 202121003903

(51) Int. Cl.
*G01N 11/00* (2006.01)

(52) U.S. Cl.
CPC ...... *G01N 11/00* (2013.01); *G01N 2011/0073* (2013.01)

(58) Field of Classification Search
CPC .................. G01N 11/00; G01N 2011/0073
See application file for complete search history.

(56) References Cited

U.S. PATENT DOCUMENTS

| | | | |
|---|---|---|---|
| 5,036,708 A * | 8/1991 | Urban | G01N 29/2425 250/339.08 |
| 2015/0150464 A1* | 6/2015 | Boctor | A61B 5/4509 600/407 |
| 2020/0110058 A1* | 4/2020 | Bai | G01N 29/2418 |

OTHER PUBLICATIONS

Lou, Cunguang, and Da Xing. "Photoacoustic measurement of liquid viscosity." Applied Physics Letters 96.21 (2010): 211102 (Year: 2010).*

(Continued)

*Primary Examiner* — Kristina M Deherrera
*Assistant Examiner* — Fatemeh Esfandiari Nia
(74) *Attorney, Agent, or Firm* — Finnegan, Henderson, Farabow, Garrett & Dunner, LLP

(57) ABSTRACT

This disclosure relates generally to a method and system for determining viscosity information of fluids. The present disclosure utilizes an intensity modulated continuous wave (CW) laser diode-based PA sensing method to obtain a continuous wave photoacoustic (CWPA) spectra. Through this CWPA spectra, a full width half maximum (FWHM) and a spectral area is determined to obtain the information about the viscosity of fluids. Although, the CWPA based sensing technique is used for distinguishing different types of abnormalities in tissues, so far it is not used for measuring viscosity which is an important thermo-physical property. The viscosity information of the fluids from the normalized Gaussian fitted CWPA spectra is based on a viscosity feature computed from a FWHM, and a spectral area. The viscosity feature improves the good of fit parameter ($R^2$) significantly to 0.98 as compared to the traditional only FWHM based viscosity determination for which $R^2$ is 0.91.

9 Claims, 8 Drawing Sheets

S: Sample (Black ink + Glycerol)
UST: Ultrasound Transducer

(56) References Cited

OTHER PUBLICATIONS

Zhao, Yue, et al. "In vivo blood viscosity characterization based on frequency-resolved photoacoustic measurement." Applied Physics Letters 113.14 (2018): 143703 (Year: 2018).*

Balogun, Oluwaseyi Oladeinde, Materials characterization using frequency domain photoacoustic microscopy. Boston University, 2006 (Year: 2006).*

Krishnan Sathiyamoorthy et al., "Experimental Design and Numerical Investigation of a Photoacoustic Sensor for a low-power, Continuous-wave, Laser-based Frequency-domain Photoacoustic Microscopy", Journal of Biomedical Optics, Oct. 2019, vol. 24, Issue: 12, SPIE. DiGiTAL LIBRARY, https://www.spiedigitallibrary.org/journals/journal-of-biomedical-optics/volume-24/issue-12/121912/Experimental-design-and-numerical-investigation-of-a-photoacoustic-sensor-for/10.1117/1.JBO.24.12.121912.full.

Leonardo Binetti et al., "Measurement of Viscoelasticity of Sodium Alginate by Fibre Bragg Grating", Proceedings, Jul. 2019, vol. 15, Issue: 1, MDPI, https://www.mdpi.com/2504-3900/15/1/33/pdf.

\* cited by examiner

METHOD AND SYSTEM FOR DETERMINING VISCOSITY INFORMATION OF FLUIDS

This U.S. patent application claims priority under 35 U.S.C § 119 to: Indian patent Application no. 202121003903, filed on Jan. 28, 2021. The entire contents of the aforementioned application are incorporated herein by reference.

TECHNICAL FIELD

The disclosure herein generally relates to viscosity of fluids, and, more particularly, to method and system for determining viscosity information of fluids.

BACKGROUND

The viscosity of liquid is one of the most important thermophysical properties in medical and industrial fields. From the few mechanical properties (such as elasticity, density, etc.), viscosity is one of the very important thermophysical property of any material (mainly liquid). Use of viscosity information in oil, paints, and various substances are technical interest for emerging field of research. The non-invasive identification of viscosity has tremendous application in the domain of clinical diagnosis and in processing of composite material. In clinical science, change in blood viscosity may be used as diagnostic tool as it is directly related to the blood flow. Also, continuous monitoring of blood's viscosity is helpful to monitor the pathological variation in vessels and several factors which may be associated with poor circulation. Apart from clinical applications, monitoring of viscosity is extremely important in several industrial processes such as quality inspection of oil, paints, etc. and most importantly in the curing process of composite materials. Subsequently, quick and cost-effective way of depicting change in viscosity is an important need for food processing industries, where the knowledge of viscosity information can lead to the measurement of dietary fibres, glucose tolerance, and thereof.

In one existing technique, the rate of flow of ink is measured using a flow meter in a bypass line in the print head which is fed with ink under substantially constant pressure. Since the flow rate will vary with the viscosity, this gives an indication of the viscosity variations. However, if the pressure at which the ink is fed varies, this can mask any effect a viscosity change. Such technique is time consuming and very laborious. In another technique, the pressure drop along a capillary tube is measured at a constant volume flow rate through the tube. The pressure drop varies with a change in the viscosity of the fluids, but this can only be monitored if the flow of fluids is held constant as required in this system. If the flow is allowed to vary, then the pressure drop due to that variation may mask any variation due to viscosity. Such technique involves several complex calculations and time consuming.

SUMMARY

Embodiments of the present disclosure present technological improvements as solutions to one or more of the above-mentioned technical problems recognized by the inventors in conventional systems. For example, in one embodiment, a system for determining viscosity information of fluids is provided. The system includes a processor, an Input/output (I/O) interface and a memory coupled to the processor is capable of executing programmed instructions stored in the processor in the memory to generate, a photoacoustic wave by irradiating the received fluids using an intensity modulated continuous wave (CW) laser diode. The intensity of the CW laser diode is modulated at a predefined frequency range based on a bandwidth of an ultrasound sensor to record a peak-to-peak amplitude of the photoacoustic wave at each frequency. The ultrasound sensor senses the photoacoustic wave of the received fluids. Further, using a preamplifier, the photoacoustic wave is amplified to obtain an amplified continuous wave photoacoustic (CWPA) signal and then averaged at a predefined sampling rate, and the viscosity information of the fluids is determined from a CWPA spectra based on a viscosity feature computed from (i) a full width at half maximum (FWHM), and (ii) a spectral area under curve, wherein the CWPA spectra is obtained by plotting the peak to peak voltage of the CWPA signal with its corresponding frequency.

In one embodiment to determine the viscosity information of the fluids a viscosity feature is computed by, obtaining at each frequency, a peak-to-peak voltage of the CWPA signal. The continuous wave photoacoustic spectra are obtained by plotting the peak-to-peak voltage with a corresponding frequency of the CWPA signal. The obtained CWPA spectra is Gaussian fitted and then normalized corresponding to the peak amplitude to determine the viscosity information of the fluids based on the viscosity feature computed from the full width at half maximum (FWHM) obtained from the from the normalized Gaussian fitted CWPA spectra.

In another aspect, provides a method for determining viscosity information of fluids is provided that includes a processor, an Input/output (I/O) interface and a memory coupled to the processor is capable of executing programmed instructions stored in the processor in the memory to generate, a photoacoustic wave by irradiating the received fluids using an intensity modulated continuous wave (CW) laser diode. The intensity of the CW laser diode is modulated at a predefined frequency range based on a bandwidth of an ultrasound sensor to record a peak-to-peak amplitude of the photoacoustic wave at each frequency. The ultrasound sensor senses the photoacoustic wave of the received fluids. Further, using a preamplifier, the photoacoustic wave is amplified to obtain an amplified continuous wave photoacoustic (CWPA) signal and then averaged at a predefined sampling rate, and the viscosity information of the fluids is determined from a CWPA spectra based on a viscosity feature computed from (i) a full width at half maximum (FWHM), and (ii) a spectral area under curve, wherein the CWPA spectra is obtained by plotting the peak to peak voltage of the CWPA signal with its corresponding frequency.

In one embodiment to determine the viscosity information of the fluids a viscosity feature is computed by, obtaining at each frequency, a peak-to-peak voltage of the CWPA signal. The continuous wave photoacoustic spectra are obtained by plotting the peak-to-peak voltage with a corresponding frequency of the CWPA signal. The obtained CWPA spectra is Gaussian fitted and then normalized corresponding to the peak amplitude to determine the viscosity information of the fluids based on the viscosity feature computed from the full width at half maximum (FWHM) obtained from the from the normalized Gaussian fitted CWPA spectra.

In yet another aspect, there are provided one or more non-transitory machine-readable information storage mediums comprising one or more instructions, which when executed by one or more hardware processors perform actions comprising generating a photoacoustic wave by irradiating the received fluids using an intensity modulated continuous wave (CW) laser diode. The intensity of the CW laser diode is modulated at a predefined frequency range based on a bandwidth of an ultrasound sensor to record a peak-to-peak amplitude of the photoacoustic wave at each frequency. The ultrasound sensor senses the photoacoustic wave of the received fluids. Further, using a preamplifier, the photoacoustic wave is amplified to obtain an amplified continuous wave photoacoustic (CWPA) signal and then averaged at a predefined sampling rate, and the viscosity information of the fluids is determined from a CWPA spectra based on a viscosity feature computed from (i) a full width at half maximum (FWHM), and (ii) a spectral area under curve, wherein the CWPA spectra is obtained by plotting the peak to peak voltage of the CWPA signal with its corresponding frequency.

In one embodiment to determine the viscosity information of the fluids a viscosity feature is computed by, obtaining at each frequency, a peak-to-peak voltage of the CWPA signal. The continuous wave photoacoustic spectra are obtained by plotting the peak-to-peak voltage with a corresponding frequency of the CWPA signal. The obtained CWPA spectra is Gaussian fitted and then normalized corresponding to the peak amplitude to determine the viscosity information of the fluids based on the viscosity feature computed from the full width at half maximum (FWHM) obtained from the from the normalized Gaussian fitted CWPA spectra.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
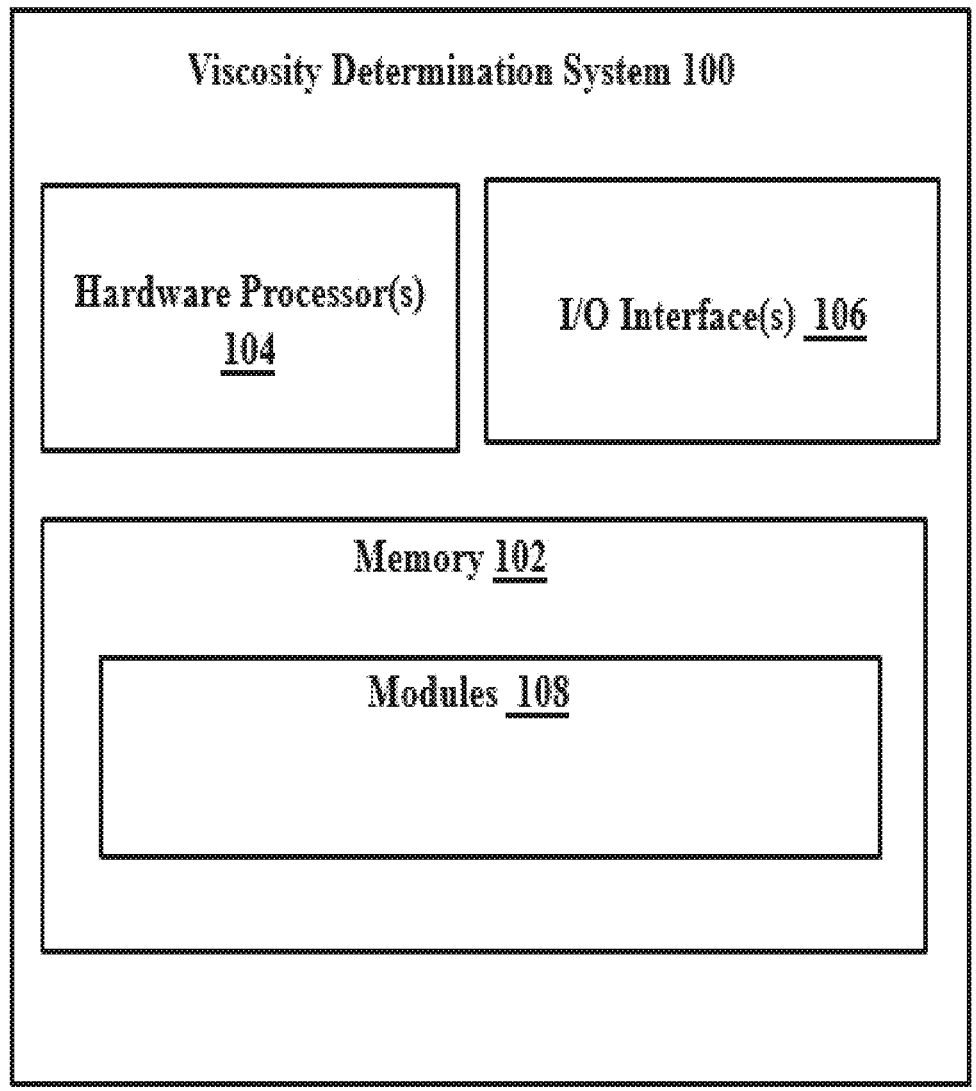
FIG. 1 illustrates an exemplary block diagram of a system (alternatively referred as viscosity determination system) for determining change in viscosity information of fluids, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provides a method and system for determining viscosity information of fluids. The method disclosed, enables determining information about the viscosity of fluids. The method of the present disclosure is a continuous wave (CW) laser diode based photoacoustic sensing method to obtain a continuous wave photoacoustic spectra (CWPA). The CWPA technique mainly comprises of (i) an excitation phase, and (ii) an acquisition phase. The excitation phase in CWPA technique is enabled by modulating the intensity of a CW laser diode beam at a specific frequency, which irradiates the fluids thereby generating the photoacoustic (PA) wave at a same frequency as that of excitation frequency. Similarly, measurement is taken for different excitation frequencies (f) and the resulting photoacoustic waves are obtained. Further, from all the photoacoustic waves, its peak-to-peak amplitude is noted and plotted against its corresponding frequencies to get the required CWPA spectra. Further, the obtained CWPA spectra is Gaussian fitted and then normalized with respect to the maximum amplitude. Subsequently, full width half maximum (FWHM) and spectral area (area under the CWPA spectra) are obtained from the normalized Gaussian fitted CWPA spectra to determine the information of the fluids viscosity. Based on these parameters (FWHM and spectral area) viscosity feature is obtained, which represents the change in viscosity of the fluids. The present disclosure provides a high degree of correlation between the sample and the computed viscosity feature. The disclosed system is further explained with the method as described in conjunction with FIG. 1 to FIG. 8 below.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

FIG. 1 illustrates an exemplary block diagram of a system (alternatively referred as viscosity determination system) for determining change in viscosity information of fluids, in accordance with some embodiments of the present disclosure. In an embodiment, the viscosity determination system 100 includes processor (s) 104, communication interface (s), alternatively referred as or input/output (I/O) interface(s) 106, and one or more data storage devices or memory 102 operatively coupled to the processor (s) 104. The system 100, with the processor(s) is configured to execute functions of one or more functional blocks of the system 100.

Referring to the components of the system 100, in an embodiment, the processor (s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, 10 hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The modules 108 can be an Integrated Circuit (IC) (not shown), external to the memory 102, implemented using a Field-Programmable Gate Array (FPGA) or an Application-Specific Integrated Circuit (ASIC). The names (or expressions or terms) of the modules of functional block within the modules 108 referred herein, are used for explanation and are not construed to be limitation(s).

Figure 2:
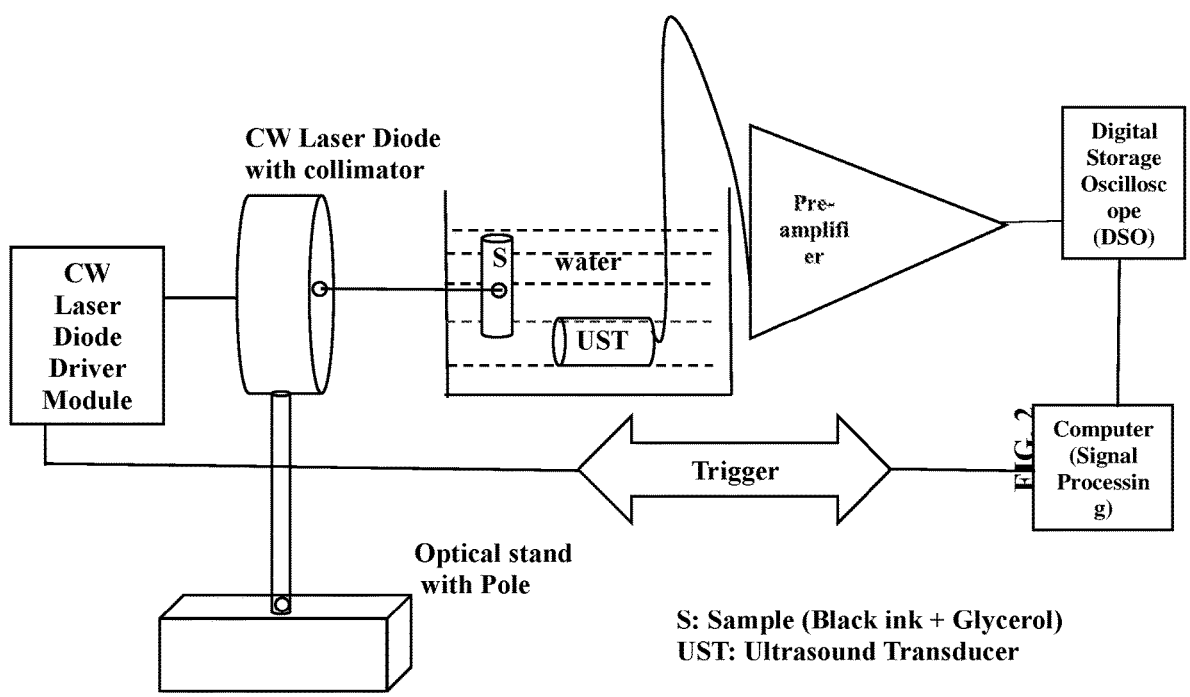
FIG. 2 illustrates an example system implemented for determining viscosity information of fluids using the system of FIG. 1, in accordance with some embodiments of the present disclosure.

FIG. 2 illustrates an example system implemented for determining viscosity information of fluids using the system of FIG. 1, in accordance with some embodiments of the present disclosure. The FIG. 2 includes a plurality of components comprising a CW laser diode driver module, a CW laser diode with collimator, a preamplifier, a digital storage oscilloscope (DSO), an ultrasound sensor, and an optical stand with pole. The ultrasound sensor is placed axially to the fluids (sample) in a container which is in front of the CW laser diode with collimator. Further, the CW laser diode with collimator irradiates the fluids to acquire an ultrasound (CWPA) signal using the ultrasound sensor. The preamplifier amplifies the acquired CWPA signal and averaging is performed using the digital storage oscilloscope to improve the signal to noise ratio (SNR). The signal processing module associated with the memory 102, further processes the amplified CWPA signal to determine a peak-to-peak voltage with its corresponding frequency to obtain CWPA spectra. The CWPA spectra is Gaussian fitted to smooth the curve and further normalized to remove artifacts present due to absorption property of the fluids. Functions of the components of system 100, for determining the viscosity of fluids, are explained in conjunction with FIG. 3 through FIG. 8 providing flow diagram, architectural overviews, and performance analysis of the system 100.

Figure 3:
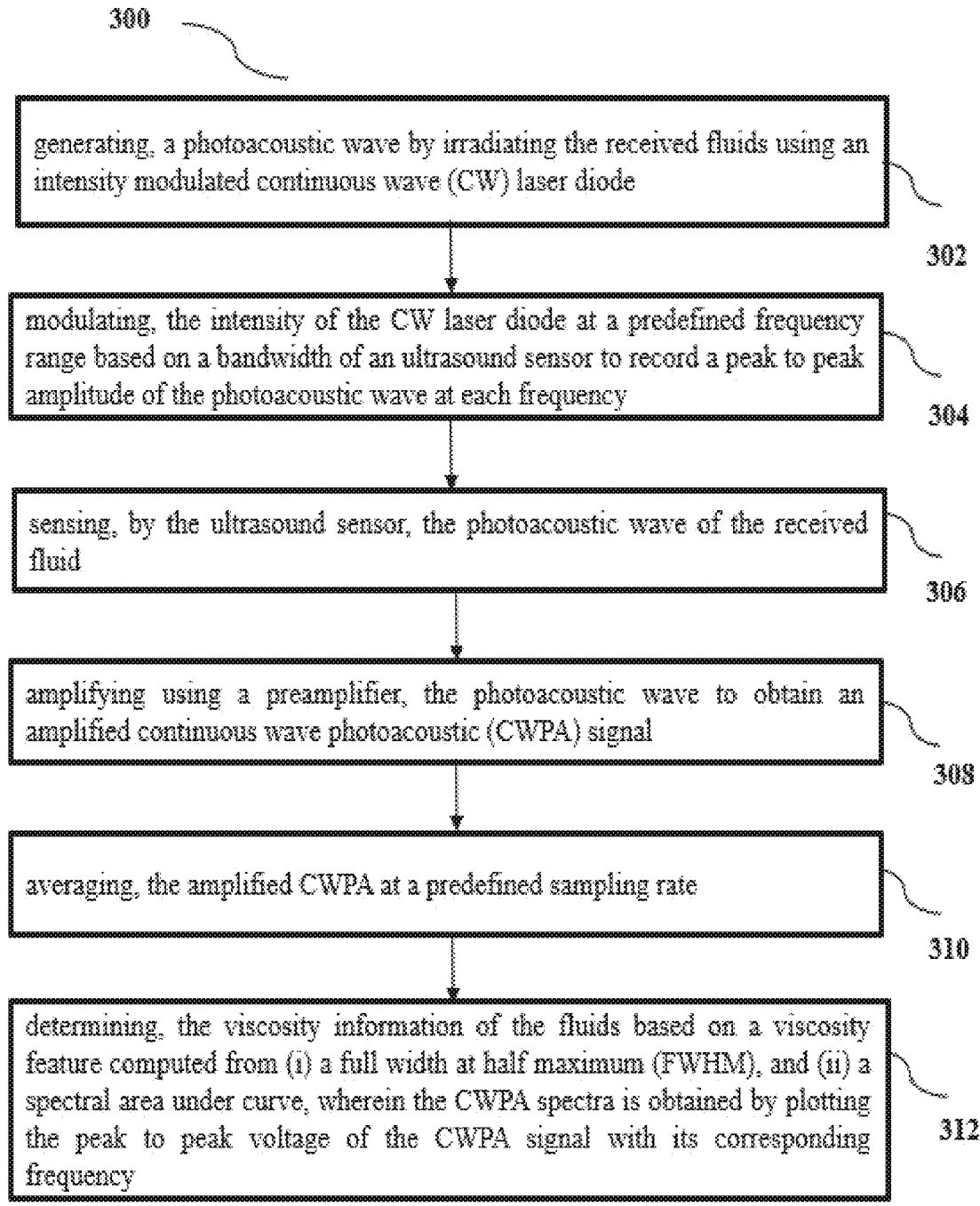
FIG. 3 illustrates a flow diagram illustrating a method for determining viscosity information of fluids using the system of FIG. 1 functionally described in FIG. 2, in accordance with some embodiments of the present disclosure.

FIG. 3 illustrates a flow diagram illustrating a method for determining viscosity information of fluids using the system of FIG. 1 functionally described in FIG. 2, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 and FIG. 2 and the steps of flow diagram as depicted in FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, a photoacoustic wave is generated via the one or more hardware processors, by irradiating the received fluids using an intensity modulated continuous wave (CW) laser diode. The excitation phase of the CWPA is enabled by the intensity modulated continuous wave (CW) laser diode beam. The laser diode used is L450P1600M from Thorlabs Inc. USA, having center wavelength, 450 nm and maximum power of 1.6 W in one example embodiment. It is to be understood by a person having ordinary skill in the art or person skilled in the art that example of such laser diode shall not be construed as limiting the scope of the present disclosure. In principle, the photoacoustic (PA) sensing method is a hybrid method that involves optical excitation and acoustic acquisition. In the excitation phase, either nano-second laser pulses or intensity modulated continuous wave laser source of specific wavelength is used to irradiate the fluids sample. The fluids sample upon absorption of these laser source undergo thermionic expansion, and further the sample relaxes (contracts) back by releasing the gained energy in a non-radiative manner i.e. producing acoustic signals. Referring now to FIG. 2, for the received fluids, the intensity of the continuous wave laser diode is modulated with a predefined frequency range depending upon the bandwidth of the ultrasound sensor. The intensity modulated laser diode is used to irradiate the fluids sample which subsequently generates the acoustic wave referred as PA wave of the same frequency (as the laser modulation frequency). At each frequency, the peak-to-peak amplitude of the PA signal is recorded. Further, these PA amplitudes are plotted against their corresponding frequencies to obtain the CWPA spectra. Further, the obtained CWPA spectra is Gaussian fitted and then normalized with respect to the maximum amplitude. Considering an example, five fluids sample of glycerol-black-ink mixture is prepared by keeping the concentration of black-ink to be fixed and then the concentration of glycerol is varied from x to y (e.g., where 'x' and Cy' ranges between 0 to 100, nd x<=y) in the steps of p % (e.g., wherein p=25%) as shown in Table 1. The Glycerol was added to the ink solution, stirred well and kept for 10 minutes for obtaining the consistency in the fluids sample. These five fluids sample act as a varying viscous model fluids for experimental results. The entire set of experiments are executed at a constant temperature of approximately 22° C. And, for each sample, the experiments are repeated three times and the CWPA spectra is obtained and hence the reproducibility of result is verified.

TABLE 1

Change observed in glycerol concentration
to produce different viscosity samples

| Fluids sample | Black ink (ml) | Glycerol (ml) |
|---|---|---|
| V1 | 2 | 0 |
| V2 | 2 | 0.5 |
| V3 | 2 | 1 |
| V4 | 2 | 1.5 |
| V5 | 2 | 2 |

The present disclosure of the system 100 is compact, economic and field-deployable. The present disclosure is further explained considering an example, where the system 100 for experimentation receives the fluids as a glycerol-black ink mixture prepared used as sample by varying the concentration of glycerol to reflect the change in its viscosity using the system of FIG. 1 and FIG. 2. The example as described where the viscosity determination system 100 determines the viscosity information of fluids.

Referring now to the steps of the method 300, at step 304, the one or more hardware processors 104 modulate the intensity of the CW laser diode at a predefined frequency range based on a bandwidth of an ultrasound sensor to record a peak-to-peak amplitude of the photoacoustic wave at each frequency. Referring now to FIG. 2, the excitation phase of the CWPA is enabled by the intensity modulated continuous wave laser diode beam. In order to modulate the intensity of the laser diode at distinct frequencies, in-house built laser driver is used. The laser driver can deliver maximum current of say 'm' amperes (e.g., m=1.2A) at a modulation frequency of say 'h' Hertz (e.g., h=3 MHz (maximum)). The modulation signal to the laser driver circuit is provided through the function generator. The laser diode beam is sinusoidally modulated through 'd' number of cycles (e.g., d=5 cycles) in the frequency range of about ranging between 'a' MHz to 'b' MHz (e.g., where values of a and b are 0.1-1.3 MHz respectively) at an interval of 'c' kHz (e.g., c=20 kHz). Upon excitation phase of the fluids sample, the ultrasound waves are generated which is of the same frequency and contains same number of cycles as that of laser beam excitation.

Referring now to the steps of the method 300, at step 306, the one or more hardware processors 104 to sense via the ultrasound sensor the photoacoustic wave of the received fluids. Further, the ultrasound signal from the fluids sample is acquired by the ultrasound sensor (from Olympus, V303-SU, center frequency 0.75 MHz) and it is placed axially to the sample container as shown in FIG. 2.

Referring now to the steps of the method 300, at step 308, the one or more hardware processors 104 to amplifying using a preamplifier, the photoacoustic wave to obtain an amplified continuous wave photoacoustic (CWPA) signal. The inherent power of the laser diode is very less, and the PA signal acquired by the ultrasound sensor is too small to be acquired by the data acquisition phase of the CWPA. Hence, the custom-built pre-amplifier board having maximum gain of 60 dB at 5 MHz (maximum frequency) has been used by the system of the present disclosure to amplify the acquired CWPA signal.

Referring now to the steps of the method 300, at step 310, the one or more hardware processors 104 to average the amplified CWPA at a predefined sampling rate. Further, this amplified CWPA signal is averaged of about 'n' times (e.g., 'n'=128 times in order to improve its signal to noise ratio (SNR) in the Digital Storage Oscilloscope (DSO) at sampling rate of p' MSPS (e.g., p=200 MSPS) and the final averaged signal is stored temporarily in the memory of DSO. Subsequently, this CWPA signal is retrieved from the memory of the DSO and transferred to the computer for further signal processing. In computer, the peak-to-peak voltage of the CWPA signal is determined at all frequencies and further this peak-to-peak voltage is plotted against its corresponding frequency to get the desired CWPA spectra. Further, the obtained CWPA spectra is Gaussian fitted and then normalized with respect to the maximum amplitude.

Figure 5:
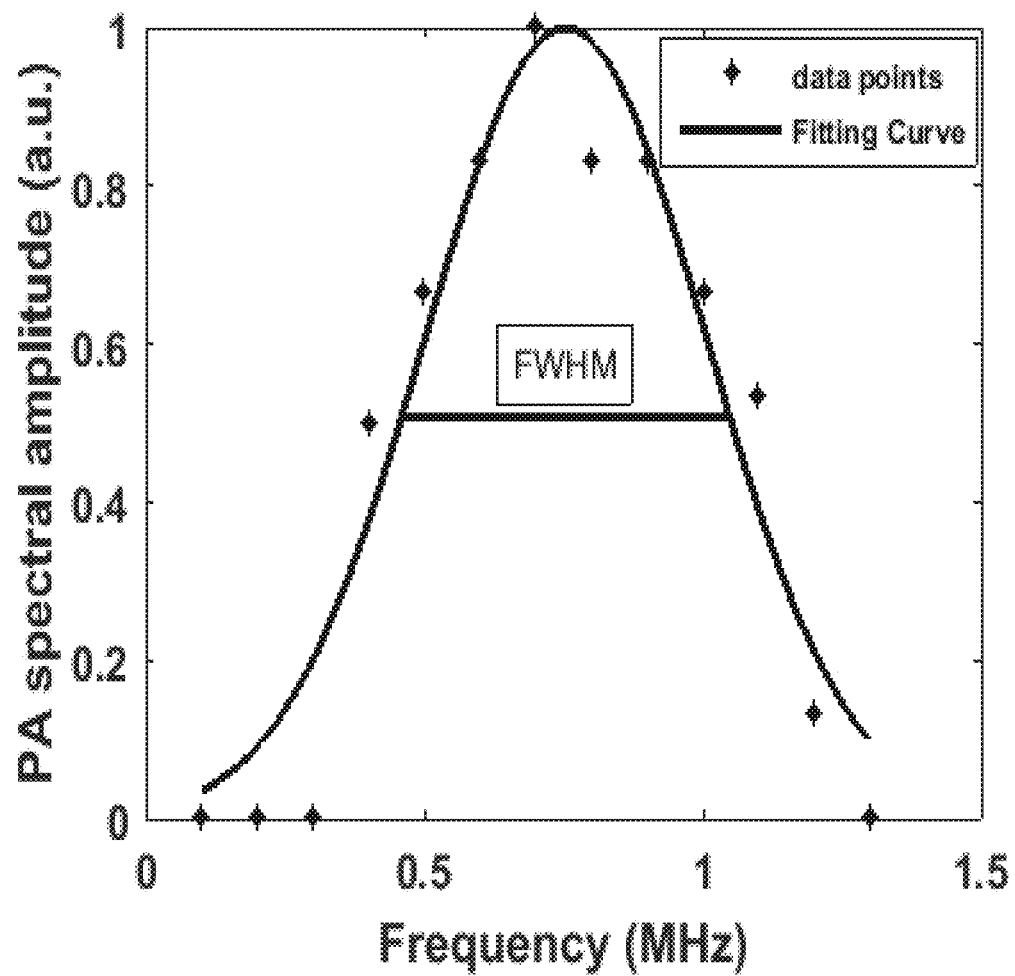
FIG. 5 illustrates a graphical representation of the normalized Gaussian fitted CWPA spectra for the example fluids using the system of FIG. 2, in accordance with some embodiments of the present disclosure.

Referring now to the steps of the method 300, at step 312, the one or more hardware processors 104 to determine the viscosity information of the fluids from a normalized Gaussian fitted CWPA spectra based on a viscosity feature computed from (i) a full width at half maximum (FWHM), and (ii) a spectral area under curve, wherein the CWPA spectra is obtained by plotting the peak-to-peak voltage of the CWPA signal with its corresponding frequency. Referring now to FIG. 5, which illustrates a graphical representation of the normalized Gaussian fitted CWPA spectra for the example fluids using the system of FIG. 2, in accordance with some embodiments of the present disclosure. To determine the viscosity information from the fluids sample, at each frequency, a peak-to-peak voltage of the CWPA signal is obtained. Further, a CWPA spectra is obtained by plotting the peak-to-peak voltage with a corresponding frequency of the CWPA signal. Subsequently, Gaussian fitting, the CWPA spectra and then normalizing, the Gaussian fitted CWPA spectra corresponding to the peak amplitude of the CWPA signal to determine the viscosity information of the fluids based on the FWHM and the spectral area under curve obtained from the normalized Gaussian fitted CWPA spectra. The CWPA spectra is first Gaussian fitted to obtain a smooth CWPA spectra and then normalized with respect to its peak amplitude. The Gaussian fitting is obtained using the equation 1 as specified below, $$y_n = a \cdot \exp^{(-(\frac{x_n - \mu}{\sigma})^2)} \quad \text{equation (1)}$$

Where,
$y_n$=the predicted value of amplitude of CWPA spectra,
a=the peak height above the base line,
$x_n$=the value of independent variable (frequency),
μ=the mean value of frequency,
σ=the standard deviation, Further, FWHM is determined from the normalized Gaussian fitted CWPA spectra to get the information about the fluids viscosity. FWHM is calculated from the normalized Gaussian fitted CWPA spectra using the standard relation as specified below in equation 2, $$\text{FWHM} = 1.66 * \sigma \quad \text{equation (2)}$$

where, α is the standard deviation as in equation 1. The FWHM is the product of 1.66 and the standard deviation σ.

Referring now to FIG. 5, shows the normalized Gaussian fitted CWPA spectra for the particular fluids (V1, as per Table 1), with FWHM marked in it. In the same way, experiments are conducted with different samples as mentioned in Table 1. The CWPA spectra is normalized to remove any artifact due to the absorption property of the sample. The excitation phase and the acquisition phase are triggered through the 1 kHz, 3V (TTL) signal. During the complete set of experimentation power modulation of the laser diode is kept constant i.e., 500 mW peak to peak, at all frequencies, with a beam diameter of 5 mm at a sample plane. Also, it is ensured that the position of laser illumination, fluids sample and the ultrasound sensor remain fixed. Moreover, the fluids container and the ultrasound sensor are immersed in the glass container filled with water to have better acoustic coupling. Since, this is the first attempt of depicting the viscosity of the sample through CWPA based spectra, the sample used are the mixtures of glycerol-black ink but not limited However, later this may be extended to in-vivo depiction of blood's viscosity. Further, the viscosity information of the fluids is determined based on the viscosity feature computed from (i) the full width at half maximum (FWHM), and (ii) the spectral area under curve, wherein the CWPA spectra is obtained by plotting the peak-to-peak voltage of the CWPA signal with its corresponding frequency, the viscosity feature is obtained from the normalized Gaussian fitted CWPA spectra as described below in equation 3, $$F1 = \frac{FWHM}{\text{spectral area under curve}} \qquad \text{equation (3)}$$

Figure 8:
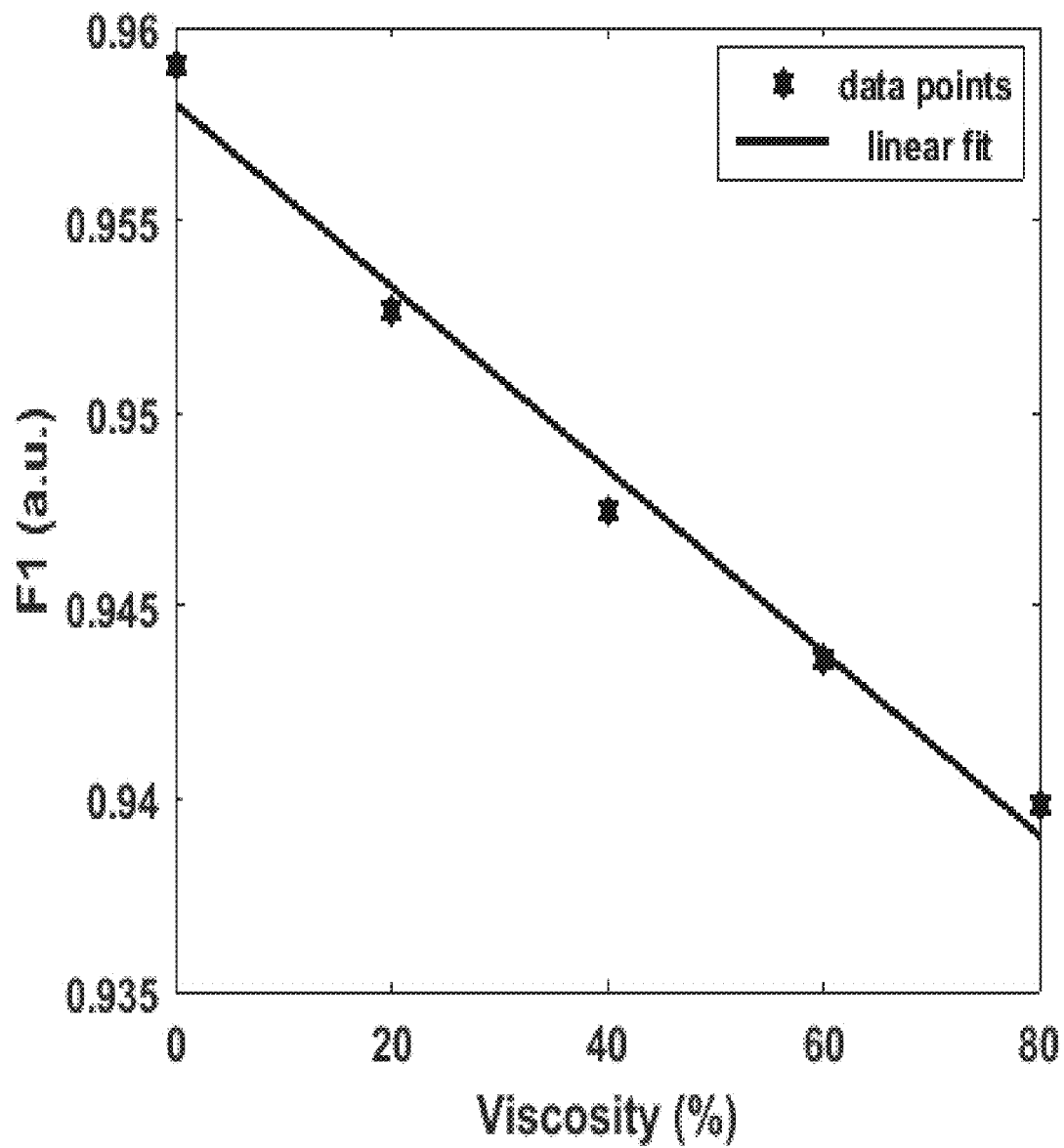
FIG. 8 illustrates a graphical representation of example fluids representing the change observed in viscosity feature corresponding to the percentage increase in viscosity using the system of FIG. 2, in accordance with some embodiments of the present disclosure.

The CWPA spectra is Gaussian fitted and then normalized corresponding to the peak amplitude. Therefore, viscosity feature (F1) can be used as an important marker to distinguish between different viscosity samples. The viscosity feature F1 shows a high degree of fit (0.98) between the data points and its linear fitted line (as shown in FIG. 8). The viscosity feature not only considers the change in FWHM but also includes the change in spectral area with the change in viscosity. The above-described equation 3 shows the viscosity feature which is the ratio of FWHM to the spectral area (i.e. the area under the Frequency spectral curve). For different viscosity samples the viscosity feature is calculated from its frequency spectra and plotted against the percentage viscosity as shown in FIG. 8.

Figure 4:
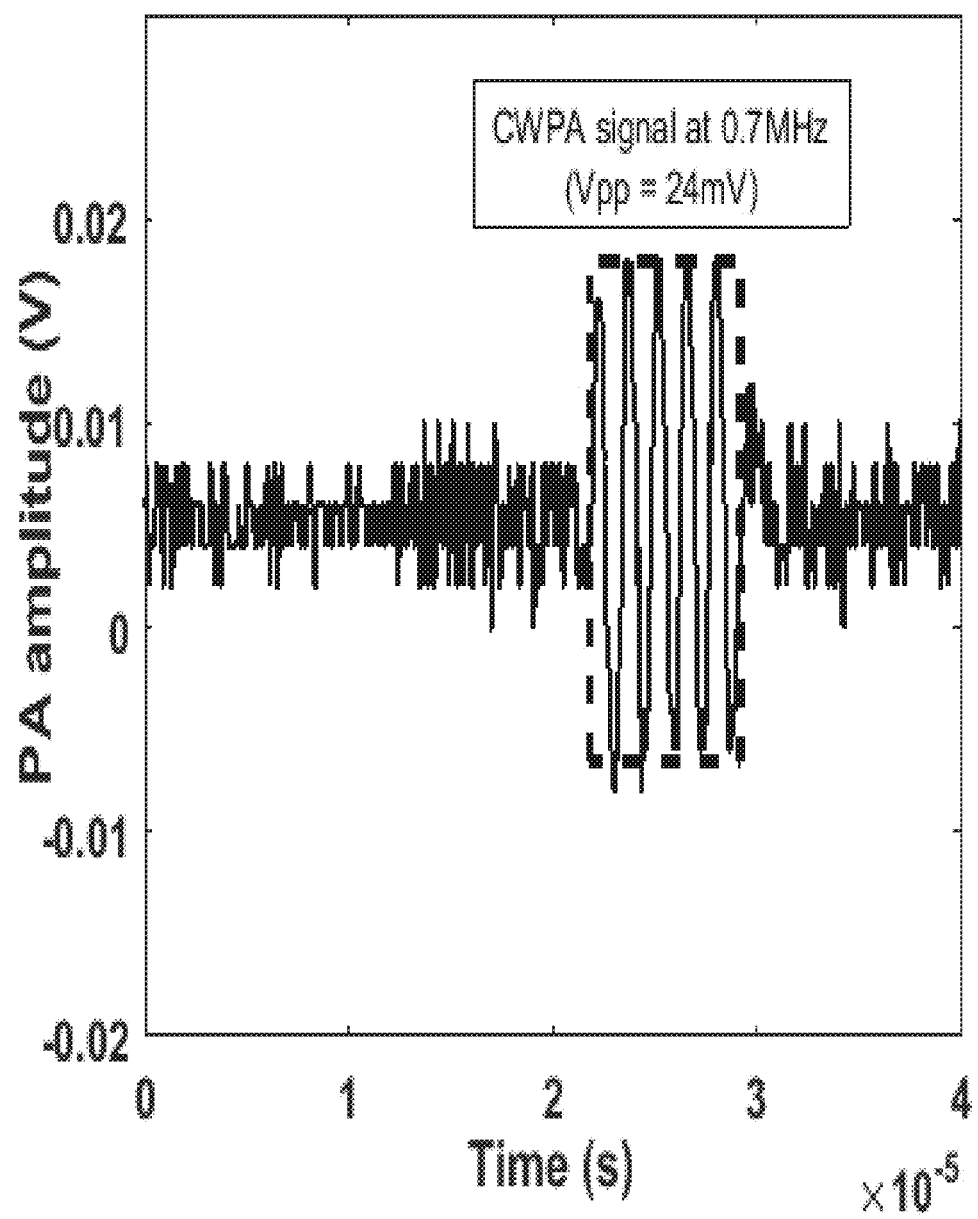
FIG. 4 illustrates a graphical representation of a continuous wave photoacoustic signal (CWPA) of an example fluids sampled at a certain frequency using the system of FIG. 2, in accordance with some embodiments of the present disclosure.

FIG. 4 illustrates a graphical representation of a continuous wave photoacoustic signals (CWPA) of an example fluids sampled at a certain frequency using the system of FIG. 2, in accordance with some embodiments of the present disclosure. The CWPA signals for one of the black ink-glycerol sample at the frequency of 0.7 MHz. The experiments are repeated by sweeping the frequency from 0.1-1.3 MHz at an interval of 20 kHz and the CWPA signals are acquired. Further, the peak-to-peak amplitude of the CWPA signals are plotted with respect to their frequencies to get the desired CWPA spectra. It is observed from the experimental results that even if the same fluids sample is excited at different frequencies at same optical power and other experimental conditions, its amplitude at the different frequencies may vary. One of the possibilities for this change in amplitude with frequency could be the viscosity of the sample. As the viscosity of the sample provides the damping force to the system such that it can restore the dynamic equilibrium, its frequency response at different frequencies can be different.

Figure 6:
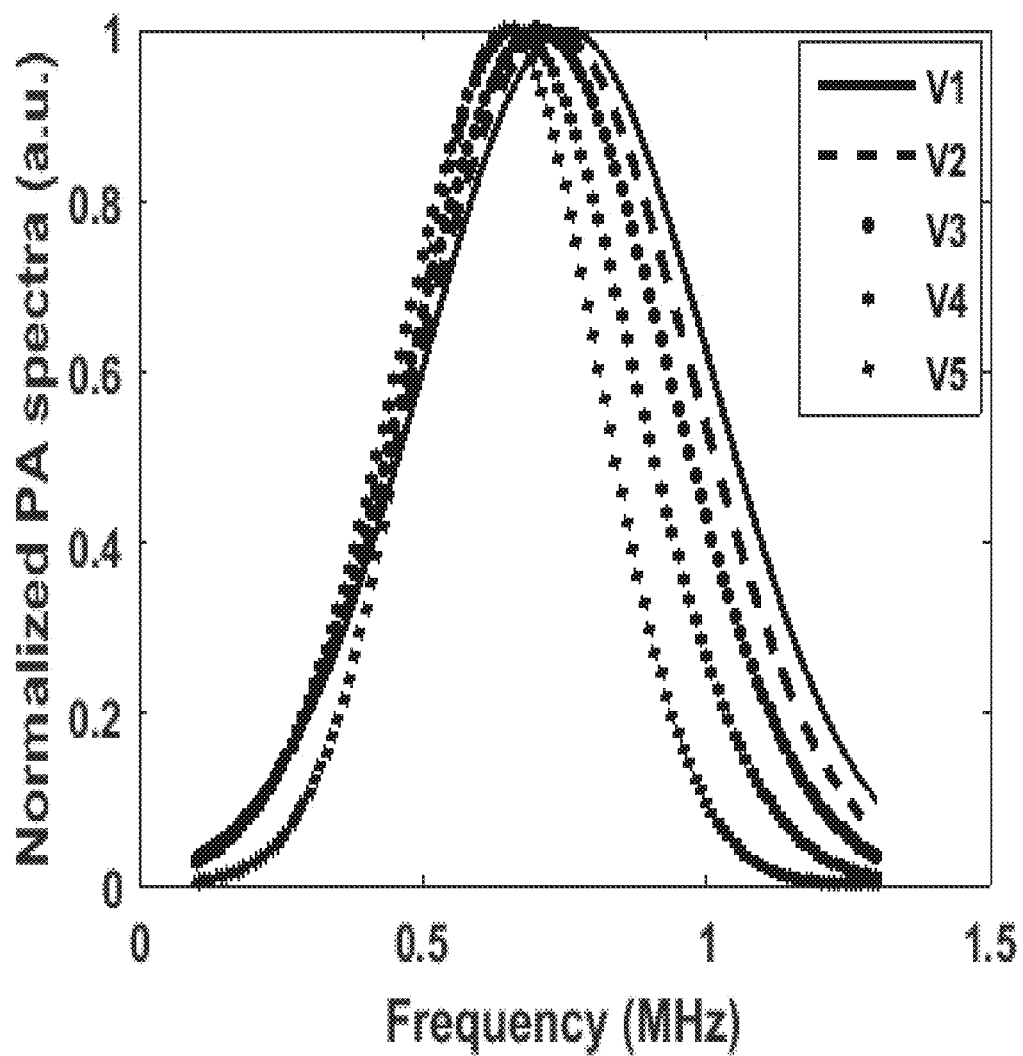
FIG. 6 illustrates a graphical representation of various example fluids with change observed in CWPA spectra using the system of FIG. 2, in accordance with some embodiments of the present disclosure.

FIG. 6 illustrates a graphical representation of various example fluids with change observed in CWPA spectra using the system of FIG. 2, in accordance with some embodiments of the present disclosure. More specifically, FIG. 6 depicts the CWPA spectra for all the fluids samples (V1-V5). More specifically, depicts change in FWHM with respect to the change in viscosity of the fluids sample. The fitted plot reflects that the FWHM reduces almost linearly with the increase in viscosity. The difference in CWPA spectra can be clearly observed for the fluids samples possessing different viscosities. For example, mean value of FWHM for V1 is 0.75 MHz whereas FWHM for V2 is 0.72 MHz and a clear pattern can be followed which reflects that the value of FWHM reduces with the increase in viscosity of the sample.

Figure 7:
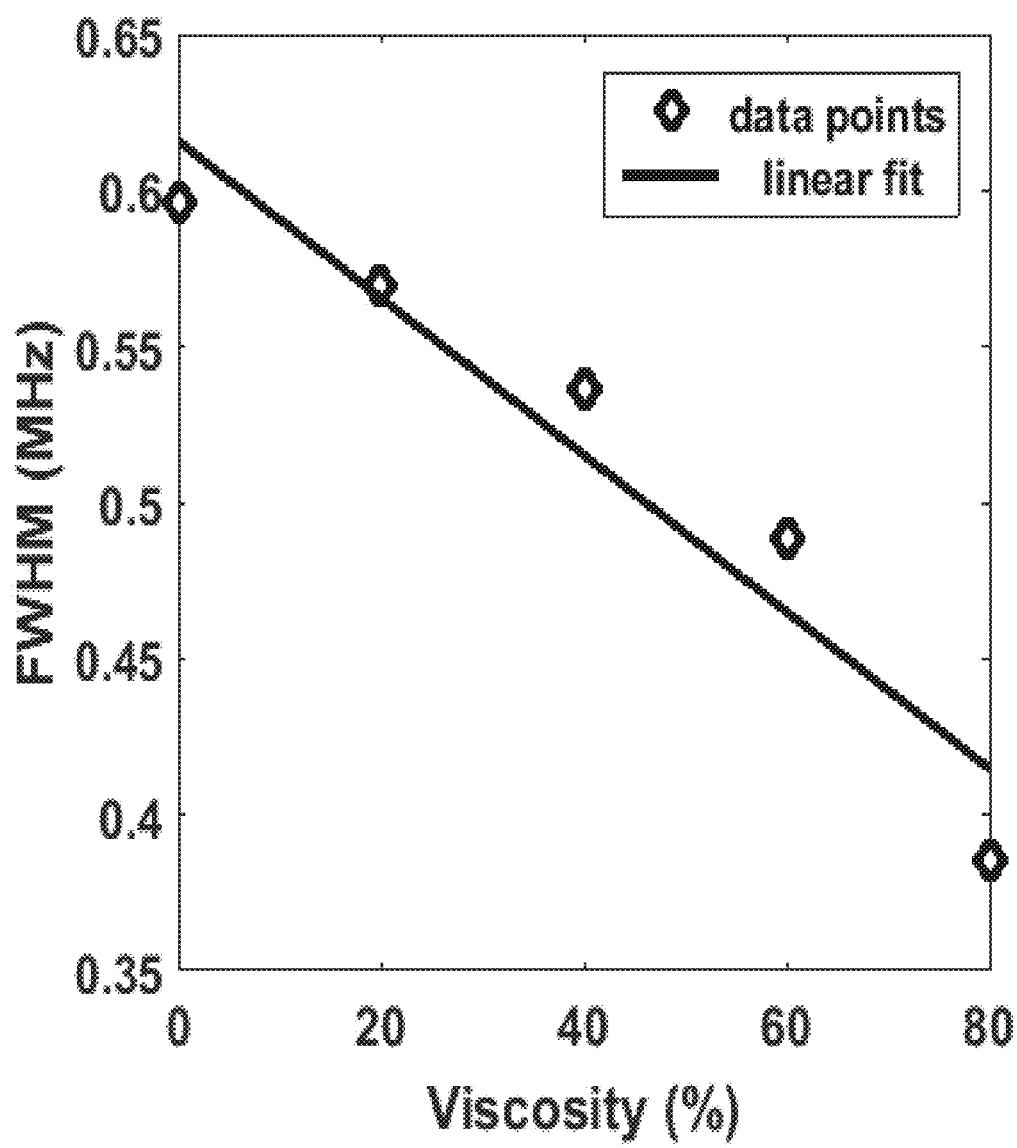
FIG. 7 illustrates a performance analysis of example fluids representing reduction in FWHM corresponding to the percentage increase in viscosity using the system of FIG. 2, in accordance with some embodiments of the present disclosure.

FIG. 7 illustrates a performance analysis of example fluids representing reduction in FWHM corresponding to the percentage increase in viscosity using the system of FIG. 2, in accordance with some embodiments of the present disclosure. For plotting the data points of FIG. 7, the mean value for each sample is considered. With the increase in viscosity of the fluids sample, the FWHM reduces. The PA signal produces wide frequency spectra signal which is limited by the frequency response of the ultrasound sensor. Although, FIG. 7 depicts that FWHM of the normalized Gaussian fitted CWPA spectra can be used to depict the viscosity of the fluids sample, the $R^2$ value (obtained between the data points and its linear fitted curve as shown in FIG. 7) is reported to be 0.91 which in turn shows a large scope for improvement. Thus this feature may not track small change in viscosity and so a better feature is sought to further increase the $R^2$ value.

FIG. 8 illustrates a graphical representation of example fluids representing the change observed in viscosity feature corresponding to the percentage increase in viscosity using the system of FIG. 2, in accordance with some embodiments of the present disclosure. The graphical representation clearly depicts that the linear fit is very closely associated with the data points leading to its $R^2$ value to be 0.98. Table 2 below provides the goodness of fit (gof) parameters and their values for plots from FIG. 7 to FIG. 8.

TABLE 2

Comparison of goodness of fit (gof) parameter for the FWHM and the viscosity feature

| Goodness of fit parameters (gof) | FWHM | Viscosity feature |
| --- | --- | --- |
| $R^2$ | 0.91 | 0.98 |

Table 2 justifies the significant improvement in the data using the viscosity feature. The $R^2$ is the statistical measure of how close the data points are to the fitted regression line.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of determining viscosity information of fluids. The embodiment thus computes viscosity feature to determine the information of viscosity which is known as the coefficient of determination, or the coefficient of multiple determination for multiple regression, with its ideal value to be 1. Therefore, the involvement of CW laser diode and in-house built components makes the overall technique very compact and field deployable. Also, the viscosity feature computed from the FWHM and spectral area makes the technique very economic and highly correlative to the sample's viscosity information. Moreover, the embodiments herein further provide a time efficient, accurate and scalable system for determining information of viscosity in fluids. The non-invasive, compact and cost-effective way to determine the change in viscosity of the sample is proposed and verified through the experimentation. Five samples having different viscosities are prepared through the mixtures of glycerol and black ink. The viscosity information of the fluids from the normalized Gaussian fitted CWPA spectra is based on a viscosity feature computed from the FWHM, and the spectral area. The viscosity feature improves the good of fit parameter ($R^2$) significantly to 0.98 as compared to the traditional only FWHM based viscosity determination for which $R^2$ is 0.91.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for determining viscosity information of fluids, the method comprising:
   generating, via one or more hardware processors, a photoacoustic wave by irradiating the fluids using a continuous wave (CW) laser diode;
   modulating, via the one or more hardware processors, an intensity of the CW laser diode at a predefined frequency range based on a bandwidth of an ultrasound sensor to record a peak-to-peak amplitude of the photoacoustic wave at each frequency;
   sensing by the ultrasound sensor, via the one or more hardware processors, the photoacoustic wave of the fluids;
   amplifying using a preamplifier, via the one or more hardware processors, the photoacoustic wave to obtain an amplified continuous wave photoacoustic (CWPA) signal;
   averaging, via the one or more hardware processors, the amplified CWPA signal at a predefined sampling rate; and
   determining, via the one or more hardware processors, the viscosity information of the fluids from a CWPA spectra based on a viscosity feature computed from (i) a full width at half maximum (FWHM), and (ii) a spectral area under curve, wherein the CWPA spectra is obtained by plotting a peak-to-peak voltage of the CWPA signal with a corresponding frequency of the CWPA signal.

2. The processor implemented method as claimed in claim 1, wherein determining the viscosity information of the fluids by computing a viscosity feature comprises:
   (i) obtaining at each frequency, the peak-to-peak voltage of the CWPA signal;
   (ii) obtaining, the CWPA spectra by plotting the peak-to-peak voltage with the corresponding frequency of the CWPA signal;
   (iii) Gaussian fitting, the CWPA spectra;
   (iv) normalizing, the Gaussian fitted CWPA spectra corresponding to the peak amplitude of the CWPA signal; and
   (v) determining, the viscosity information of the fluids based on the FWHM and the spectral area under curve obtained from the normalized Gaussian fitted CWPA spectra.

3. The processor implemented method as claimed in claim 1, wherein the viscosity feature is computed based on a ratio of the full width at half maximum (FWHM) and the spectral area under curve.

4. A system 100, for determining viscosity information of fluids comprising:
   a memory (102) storing instructions;
      one or more communication interfaces (106); and
      one or more hardware processors (104) coupled to the memory (102) via the one or more communication interfaces (106), wherein the one or more hardware processors (104) are configured by the instructions to:
         generating, a photoacoustic wave by irradiating the fluids using a continuous wave (CW) laser diode;
         modulating, an intensity of the CW laser diode at a predefined frequency range based on a bandwidth of an ultrasound sensor to record a peak-to-peak amplitude of the photoacoustic wave at each frequency;
         sensing, by the ultrasound sensor, the photoacoustic wave of the received fluids;
         amplifying using a preamplifier, the photoacoustic wave to obtain an amplified continuous wave photoacoustic (CWPA) signal;
         averaging, the amplified CWPA signal at a predefined sampling rate; and
         determining, the viscosity information of the fluids from a CWPA spectra based on a viscosity feature computed from (i) a full width at half maximum (FWHM), and (ii) a spectral area under curve, wherein the CWPA spectra is obtained by plotting a peak-to-peak voltage of the CWPA signal with a corresponding frequency of the CWPA signal.

5. The system 100 as claimed in claim 4, wherein determining the viscosity information of the fluids by computing a viscosity feature comprises:
   (i) obtaining at each frequency, a peak-to-peak voltage of the CWPA signal;
   (ii) obtaining, the CWPA spectra by plotting the peak-to-peak voltage with a corresponding frequency of the CWPA signal;
   (iii) Gaussian fitting, the CWPA spectra;
   (iv) normalizing, the Gaussian fitted CWPA spectra corresponding to the peak amplitude of the CWPA signal; and
   (v) determining, the viscosity information of the fluids based on the FWHM and the spectral area under curve obtained from the normalized Gaussian fitted CWPA spectra.

6. The system 100 as claimed in claim 4, wherein the viscosity feature is computed based on a ratio of the full width at half maximum (FWHM) and the spectral area under curve.

7. One or more non-transitory machine-readable information storage mediums comprising one or more instructions which when executed by one or more hardware processors perform actions comprising:
   generating, a photoacoustic wave by irradiating the fluids using a continuous wave (CW) laser diode;
   modulating, an intensity of the CW laser diode at a predefined frequency range based on a bandwidth of an ultrasound sensor to record a peak-to-peak amplitude of the photoacoustic wave at each frequency;
   sensing, by the ultrasound sensor, the photoacoustic wave of the received fluids;
   amplifying using a preamplifier, the photoacoustic wave to obtain an amplified continuous wave photoacoustic (CWPA) signal;
   averaging, the amplified CWPA signal at a predefined sampling rate; and
   determining, the viscosity information of the fluids from a CWPA spectra based on a viscosity feature computed from (i) a full width at half maximum (FWHM), and (ii) a spectral area under curve, wherein the CWPA spectra is obtained by plotting a peak-to-peak voltage of the CWPA signal with a corresponding frequency of the CWPA signal.

8. The one or more non-transitory machine-readable information storage mediums of claim 7, wherein determining the viscosity information of the fluids by computing a viscosity feature comprises:
   (i) obtaining at each frequency, a peak-to-peak voltage of the CWPA signal;
   (ii) obtaining, the CWPA spectra by plotting the peak-to-peak voltage with a corresponding frequency of the CWPA signal;
   (iii) Gaussian fitting, the CWPA spectra;
   (iv) normalizing, the Gaussian fitted CWPA spectra corresponding to the peak amplitude of the CWPA signal; and
   (v) determining, the viscosity information of the fluids based on the FWHM and the spectral area under curve obtained from the normalized Gaussian fitted CWPA spectra.

9. The one or more non-transitory machine-readable information storage mediums of claim 7, wherein the viscosity feature is computed based on a ratio of the full width at half maximum (FWHM) and the spectral area under curve.

* * * * *